United States Patent [19]
Mangler et al.

[11] Patent Number: 5,436,541
[45] Date of Patent: Jul. 25, 1995

[54] RAIN DETECTOR

[76] Inventors: Jürgen Mangler, Röhrigstr 7, 7554 Kuppenheim 2; Peter Nolting, Scheffelweg 24, 7582 Bühlertal, both of Germany

[21] Appl. No.: 88,348
[22] PCT Filed: Mar. 16, 1992
[86] PCT No.: PCT/DE92/00222
§ 371 Date: Jul. 9, 1993
§ 102(e) Date: Jul. 9, 1993
[87] PCT Pub. No.: WO92/18359
PCT Pub. Date: Oct. 29, 1992
[51] Int. Cl.6 ............................................. G05B 5/00
[52] U.S. Cl. ................................. 318/483; 318/480; 318/443; 318/444
[58] Field of Search .............. 318/480, 483, 443, 444; 15/250.2, 250.1

[56] References Cited

U.S. PATENT DOCUMENTS

| | | | |
|---|---|---|---|
| 4,908,554 | 3/1990 | Chance | 318/483 |
| 4,916,374 | 4/1990 | Schierbeek et al. | |
| 4,956,591 | 9/1990 | Schierbeek et al. | 318/483 |
| 4,987,354 | 1/1991 | Steinmann. | |
| 5,140,234 | 8/1992 | Wallrafen | 318/483 |
| 5,157,312 | 10/1992 | Wallrafen | 318/483 |
| 5,233,277 | 8/1993 | Kasig et al. | 318/480 |
| 5,239,244 | 8/1993 | Teder | 318/483 |

FOREIGN PATENT DOCUMENTS

WO83/02093  6/1983  WIPO.
WO89/00119  1/1989  WIPO.

*Primary Examiner*—William M. Shoop, Jr.
*Assistant Examiner*—Karen Masih

[57] ABSTRACT

A rain detector in which the level of a sensor signal (15) which is emitted by a sensor (14) or the level of a sensor signal (17) which is processed by a signal processing unit (16) is set at a predetermined resting level (44) by a control unit (19, 30). This use of a predetermined reference level makes possible an automatic calibration of the rain detector which takes into consideration all tolerances for electrical and optical components, their age-related drift, and tolerances during the installation of the rain detector.

19 Claims, 1 Drawing Sheet

RAIN DETECTOR

BACKGROUND OF THE INVENTION

The point of departure for this invention is a rain detector of the type which includes a sensor for a windshield and means for comparing the level of a signal emitted by the sensor to a threshold, with the means for comparing emitting a switching signal to a windshield wiper unit. German Patent DE 3,314,770 discloses a rain detector of this type that emits a signal for controlling a windshield wiper system. The signal emitted by the sensor is a measure of the water or dirt on the wetted windshield which might have to be cleaned.

The rain detector is based on an optical measuring method. Radiation is coupled from a radiation source through a prism into the windshield and hits the surface of the windshield which requires cleaning. The radiation is reflected at a defined angle from the exterior surface of the windshield that is wetted with water or soiled, and is further conducted through the windshield and coupled out of the windshield through the prism. The reflected radiation is detected by a radiation sensor, which gives a signal to an evaluation unit that is connected to its output. The radiation sensor detects only those radiation components which are emitted by the radiation source and reflected on the surface of the windshield at the angle producing total reflection. During undisturbed total reflection, the radiation sensor gives off a signal at a certain level or quiescent level. This level corresponds to a resting level. If there are changes in the intensity of the totally reflected radiation caused by water drops or dirt particles, the level of the emitted signal changes and is compared with a threshold. If the threshold is exceeded, the switch-on signal for a windshield wiper system is emitted.

The threshold, with which the signal emitted from the sensor is compared, is automatically adjusted as a function of the extreme value of the signal level. This adjustment of the threshold compensates for long-term drift and temperature drift of the electronic circuit and takes into consideration the condition of the windshield surface, which changes constantly, for example, due to scratches. The adjustment range is limited to the input voltage range that an amplifier which is connected as a comparator is able to process.

In addition to long-term and temperature drift, the resting level of the signal emitted by the sensor depends notably on the structural conditions for the installation of the rain detector on the windshield. In addition to manufacturing tolerances during the production of electronic and optical components, different windshield thicknesses, different spectral transmission coefficients of the windshields and, particularly, the technique of connecting the rain detector to the windshield must be taken into consideration.

SUMMARY OF THE INVENTION

It is the object of the invention to provide a rain detector which ensures that the level of the signal emitted by a sensor is largely independent of manufacturing and installation and can be set to easily manageable values.

This object is attained by providing means which compares the level of the signal emitted by the sensor and corresponding to a clean windshield with a reference signal, and which adjusts the sensor signal to a predetermined resting level.

The advantage of the device according to the invention is that, due to the control of the level of the signal to a predetermined resting level, a signal emitted by the sensor and corresponding to a clean windshield, manufacturing tolerances of individual rain detector components, and tolerances during the installation of the rain detector can be compensated over a wide range. This range may encompass a plurality of decades. The rain detector can thus be realized almost independently of its application. It is no longer necessary to adjust the threshold to which the resting potential is compared in order to obtain from this comparison a switching signal for the windshield wiper system.

The control is particularly easily implemented, if the rain detector contains variable amplification factor means for amplifying the signal emitted by the sensor.

If the rain detector contains means for emitting a signal whose changes are detected on account of the condition of the windshield, the control is realized particularly easily because the power of the emitted signal is changed.

The rain detector may be realized particularly cost-effectively with an optoelectronic radiation sensor which receives the signal emitted by a radiation source.

The device according to the invention is particularly suitable for use in motor vehicles, because manual operation of a windshield wiper system by the driver is thus no longer necessary. Because calibration for the rain detector may be omitted, its mass production results in advantageous prices.

Further advantageous modifications and configurations of the device according to the invention are elucidated in the following specification.

DESCRIPTION OF THE PREFERRED EMBODIMENTS

Figure 1:
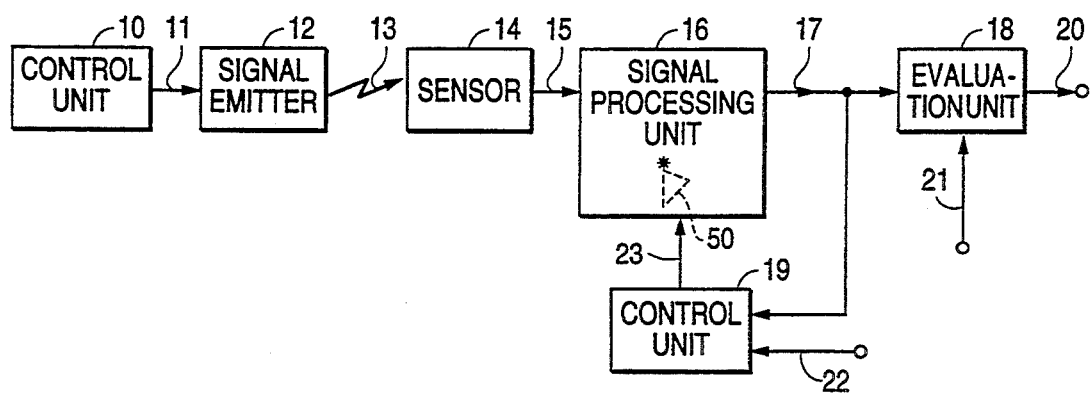
FIGS. 1 and 2 show block circuit diagrams of two embodiments of a rain detector according to the invention.

FIG. 1 shows a control unit 10 which emits a control signal 11 to a signal emitter means 12, which emits a signal 13 on which the measured effect is based. The signal 13 is detected by a sensor 14 that gives a sensor signal 15 to a signal processing unit 16. The signal processing unit 16 gives a processed sensor signal 17 to an evaluation unit 18 and to a control unit 19. The evaluation unit 18 determines a switching signal 20 for turning on a non-illustrated windshield wiper system as a function of the processed sensor signal 17 and as a function of a predeterminable threshold 21. As a function of the processed signal 17 and as a function of a reference signal 22, the control unit 19 determines a regulating signal 23 which is fed to the signal processing unit 16.

Figure 2:
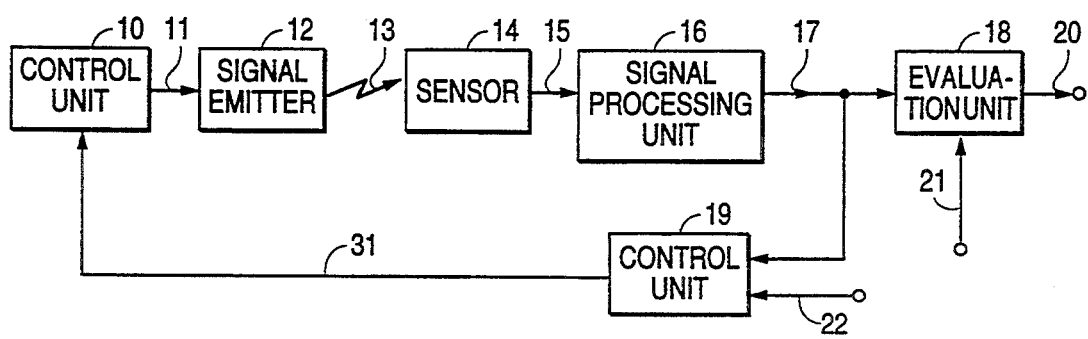

FIG. 2 shows another embodiment of the device according to the invention which, by comparison with the embodiment shown in FIG. 1, shows another control unit 30 that emits a different regulating signal 31 to the control unit 10. The remaining parts of the device shown in FIG. 2 correspond to the parts shown in FIG. 1 and therefore bear the same respective reference numerals.

Figure 3:
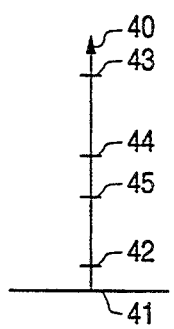
FIG. 3 shows the signal levels which occur in the rain detector according to the invention.

In FIG. 3, levels 40 of signals are shown which occur in the embodiments of the device according to the invention with respect to a reference level 41. Levels 42 and 43 are lower and upper limits of sensor signal 15 or of the processed sensor signal 17 which are fixed with respect to subsequent arrangements. Level 44 is a resting level which the sensor signal 15 or the processed sensor signal 17 has in the adjusted state for a clean windshield. Level 45 corresponds to threshold 21 which occurs in the evaluation unit 18.

The device according to the invention will now be explained in more detail by way of the block circuit diagrams of the embodiments shown in FIGS. 1 and 2 in combination with the levels 40 shown in FIG. 3:

The device is explained by starting with a basic optoelectronic rain detector which includes the control unit 10, means 12, sensor 14, and, if applicable, the signal processing unit 16 and the evaluation unit 18. The invention is also suitable, in place of such an optoelectronic rain detector, for use with any other detector principle in which the sensor 14 and, if applicable, the signal processing unit 16 are provided. Acoustic, capacitative and resistive rain detectors, which contain a sensor 14, are known. The acoustic rain sensor converts sound waves into a corresponding electric output signal. The resistive rain sensor changes its conductance value on account of moisture, and the capacitative sensor changes its capacitance value if moisture or dirt, which correspond to a change in the dielectric material of a capacitor, appear on the windshield. Rain detectors also exist which contain a sensor 14 that receives the signals emitted by means 12. The basic rain detector 10, 12, 14, 16, 18, on which the specification is based, employs a measuring principle in which the means 12 comprise a radiation source that emits optical radiation 13 which is received by a radiation sensor 14. Still other basic rain detectors 10, 12, 14, 16, 18 are known in which the means 12 emit high-frequency electromagnetic radiation whose frequency preferably lies in the GHz range. In this case the sensor 14 is configured as a microwave sensor.

In the embodiments shown in FIGS. 1 and 2, means 12 emits optical radiation 13, which is detected by at least one radiation sensor 14. The configuration of the optical path, which includes the windshield, is not described in greater detail here. This path is described, for example, in the prior art discussed above. Means 12 includes at least one radiation source which is caused by a control signal 11 from the control unit 10 to emit radiation signal 13. The control unit 10 contains, for example, a driver circuit with which the power of the radiation source may be changed. In the embodiment shown in FIG. 1 the radiation power is predetermined. On account of radiation being coupled out of a windshield that is wetted with dirt or moisture, the radiation received by the radiation sensor 14 is weakened. The required electrical and optical components also influence the received radiation power. The thickness of the windshield and the transmission coefficient of the windshield material have a considerable influence. Moreover, the quality of the optical coupling of means 12 and sensor 14 to the windshield and their positioning in relation to one another determine to a significant extent the radiation power that can be received.

The invention provides that these influences are eliminated by means of a control process. This is why a control unit 19 or another control unit 30 is provided. The control unit 19 feeds the regulating signal 23 to the signal processing unit 16 as a function of a comparison between the processed sensor signal 17 and the reference signal 22. Signal processing unit 16 may also be omitted, if the sensor 14 emits a signal 15 that is immediately evaluated. The signal processing unit 16 may also be manufactured as an integral part of the sensor 14, in which case, only the processed sensor signal 17 appears outside of the sensor module manufactured in this manner. The regulating signal 23, for example, influences the amplification factor of an amplifier 50 contained in the signal processing unit 16, so that, if the windshield is clean, the processed sensor signal 17 has predetermined resting level or quiescent level 44. The resting level 44 is advisably adapted to the subsequent evaluation unit 18. If the evaluation unit 18 contains analog components, resting level 44 lies approximately in the middle between the lower level limit 42 and the upper level limit 43 within which the evaluation unit 18 operates. On the one hand, this measure prevents the overdriving of amplifiers which may be present and, on the other hand, it becomes possible to utilize a maximal signal swing during changes in the processed signal 17, thereby increasing protection against interference signals. The resting level 44 is determined with respect to the reference signal 22. Thus, the level of the reference signal expediently corresponds to the resting level 44.

The evaluation unit 18 to which the sensor signal 15 or the processed sensor signal 17 is fed, determines switching signal 20 by comparing signal 15, 17 with the predetermined threshold 21; this switching signal 20 is fed to a non-illustrated windshield wiper system. This threshold has the predetermined level 45 which, in the illustrated example, lies a certain amount below the resting level 44. The distance between the two levels 44, 45 may either be fixed beforehand or may be kept variable. Wetting of the windshield or the precipitation of moisture results in a decrease the level of the sensor signal 15 or of the processed sensor signal 17 which level then deviates from the resting level 44. Subsequent to exceeding threshold 21, which is fixed at level 45, the evaluation unit 18 emits a turn-on signal by way of switching signal 20.

In place of the readjustment of the amplification of a sensor signal 15 shown in FIG. 1, the other control unit 30, which emits the other regulating signal 31, provides readjustment of the signal power emitted by means 12 with the help of the control unit 10.

A combination of both types of readjustment is also particularly advantageous, because the signal adjustment range is again increased by several decades. The control unit 19, 30 must be configured in such a way that, by comparison with the sensor signal 15 or with the processed sensor signal 17, the regulating signal 23, 31 changes only extremely slowly so that changes in the sensor signal 15 or in the processed sensor signal 17, which represents changes in the state of the windshield are not controlled away.

In one configuration, a calibration process is provided during the initial operation of the device according to the invention, thus ensuring that the resting level 44 of the sensor signal 15 or of the processed sensor signal 17 corresponds to a clean windshield. During the subsequent operation, a gradual adjustment to a long-term average value of the sensor signal 15 may be provided, resulting in the interruption of an average value formation following signal changes at speeds that exceed a certain predetermined value. This measure prevents the association of the resting level 44 with a relatively very dirty windshield or one wetted with fluid.

Another possibility for carrying out the calibration process is provided a few seconds after a wash-wipe cycle of the windshield wiper system. Here too, it is sensible to predetermine a maximum value for the signal change speed thereby ensuring that it is not raining and that streaks that may be present are dry.

What is claimed is:

1. An improved rain detector which includes a sensor for a windshield, the sensor emitting a signal having a level, and first means for comparing the level of the signal emitted by the sensor with a threshold, with the first means emitting a switching signal to a windshield wiper unit based on a result of the comparison of the level of the signal and the threshold, wherein the improvement comprises: a second means for comparing the level of the signal emitted by the sensor which corresponds to a clean windshield with a reference signal, and for adjusting the signal emitted by the sensor to a predetermined resting level.

2. A rain detector according to claim 1, wherein the resting level corresponds to the level of the reference signal.

3. A rain detector according to claim 1, wherein the second means comprises a control unit for emitting a regulating signal, and further comprising a signal processing unit which includes amplification means for amplifying the sensor signal, the amplification means having an amplification factor which is changed by the regulating signal emitted by the control unit.

4. A rain detector according to claim 1, wherein the second means comprises a first control unit, and further comprising third means for emitting a signal for detecting a rain condition on the windshield, the third means having a power output, and a second control unit which changes the power output of the third means in response to a regulating signal emitted by the first control unit.

5. A rain detector according to claim 1, further comprising a radiation source which emits radiation that is received by the sensor.

6. A rain detector according to claim 1, wherein the signal emitted by the sensor has a long-term average value, the long-term average value of the sensor signal being used as the resting level.

7. A rain detector according to claim 1, wherein the resting level is determined at predetermined times.

8. A rain detector according to claim 6, wherein the resting level cannot be set during periods when the sensor signal changes at a speed that is greater than a predetermined speed of signal change.

9. A rain detector according to claim 1, wherein the predetermined resting level is not zero.

10. A rain detector for use with a vehicle having a windshield and a windshield wiper unit, comprising:
   first means for emitting a first signal to the windshield;
   second means, including a sensor for sensing the first signal, for generating a second signal which provides information about how the state of the windshield has influenced the first signal, the second signal being based on the first signal sensed by the sensor;
   third means for adjusting the second signal so that the second signal has a predetermined resting value when the information provided by the second signal indicates that the windshield is in a predetermined state; and
   fourth means for comparing the second signal and a threshold signal to generate a switching signal for the windshield wiper unit.

11. The rain detector of claim 10, wherein the first means comprises a signal emitter having a variable power output and a first control unit which controls the power output of the signal emitter in response to a regulating signal applied to the first control unit, and wherein the third means comprises a second control unit which receives the second signal and a reference signal and which generates the regulating signal applied the first control unit based on the second signal and the reference signal.

12. The rain detector of claim 10, wherein the first signal is an optical signal and the sensor is an optical sensor.

13. The rain detector of claim 10, wherein the second signal has a plurality of values at a plurality of different times, each value of the second signal depending on a state of the windshield at each respectively different time of the plurality of the different times, and wherein the predetermined resting value of the second signal is determined based on the values of the second signal at the respectively different times of the plurality of different times.

14. The rain detector of claim 13, wherein the predetermined resting value of the second signal is based on a long-term average of the second signal with the rapid changes of the value of the second signal being excluded from the long term average.

15. The rain detector of claim 10, wherein the predetermined state of the windshield is a non-dirty, non-wet state.

16. The rain detector of claim 10, wherein the sensor generates a sensor signal, and wherein the second means additionally includes a signal processing unit which receives the sensor signal and generates the second signal.

17. The rain detector of claim 16, wherein the third means comprises a control unit which receives the second signal and a reference signal and which generates a regulating signal based on the second signal and the reference signal, the signal processing unit being responsive to the regulating signal.

18. The rain detector of claim 17, wherein the signal processing unit comprises an amplifier having an amplification factor, and wherein the regulating signal generated by the control unit controls the amplification factor of the amplifier.

19. The rain detector of claim 16, wherein the first means comprises a signal emitter having a variable power output and a first control unit which controls a power output of the signal emitter in response to a regulating signal applied to the first control unit, and wherein the third means comprises a second control unit which receives the second signal and a reference signal and which generates the regulating signal applied to the first control unit based on the second signal and the reference signal.

* * * * *

UNITED STATES PATENT AND TRADEMARK OFFICE
CERTIFICATE OF CORRECTION

PATENT NO. : 5,436,541
DATED : July 25, 1995
INVENTOR(S) : Jurgen MANGLER, Peter NOLTING It is certified that error appears in the above-indentified patent and that said Letters Patent is hereby corrected as shown below:

On title page of Patent No. 5,436,541 after [76] Inventors, please add:

--[73] Assignee:   Robert Bosch GmbH
                   Stuttgart, Germany--;

in Column 2 on the title page, after Assistant Examiner--Karen Mashi, please add:

--Attorney, Agent, or Firm--Spencer, Frank & Schneider--.

Signed and Sealed this

Thirteenth Day of February, 1996

Attest:

BRUCE LEHMAN

*Attesting Officer*    *Commissioner of Patents and Trademarks*